United States Patent [19]
Hoekstra

[11] 3,767,453
[45] Oct. 23, 1973

[54] METHOD OF DEPOSITING A HIGH SURFACE AREA ALUMINA FILM ON A RELATIVELY LOW SURFACE AREA SUPPORT

[75] Inventor: James Hoekstra, Evergreen Park, Ill.
[73] Assignee: Universal Oil Products Company, Des Plaines, Ill.
[22] Filed: June 30, 1971
[21] Appl. No.: 158,589

[52] U.S. Cl. ........... 117/46 CA, 117/62, 117/169 R, 252/313, 252/463
[51] Int. Cl. ........................... B01j 11/46, B44d 1/44
[58] Field of Search ...................... 252/313 R, 463; 117/169 R, 62, 119.6, 46 CA

[56] References Cited
UNITED STATES PATENTS 2,696,474  12/1954  Heard .............................. 252/313 R
3,098,044  7/1963   Glover ............................ 252/313 R
3,105,053  9/1963   Cramer et al. ................... 252/313 R
2,931,779  4/1960   White .............................. 252/313 R
3,031,418  4/1962   Bugosh .......................... 252/313 R

OTHER PUBLICATIONS

Golding Polymers and Resins Van Nostrand Co., Princeton, N.J. (1959) pgs. 354 & 355.

*Primary Examiner*—William D. Martin
*Assistant Examiner*—M. Sofocleous
*Attorney*—James R. Hoatson, Jr. et al.

[57] ABSTRACT

A relatively low surface area honeycomb-type ceramic support is impregnated with an alumina sol containing as a soluble plasticizer at least about 5 wt. percent of a polyethylene glycol having an average molecular weight from about 200 to about 3000. The support is thereafter calcined to form a uniformly thin, high surface area alumina film thereon.

8 Claims, No Drawings

METHOD OF DEPOSITING A HIGH SURFACE AREA ALUMINA FILM ON A RELATIVELY LOW SURFACE AREA SUPPORT

This invention relates to a novel method of catalyst manufacture. More particularly, this invention relates to a method of depositing a high surface area alumina as a uniform thin film on a relatively low surface area ceramic support. The present invention is particularly adapted to the manufacture of a rigid, unitary, catalytic element useful to catalyze the oxidation of carbon monoxide and unburned hydrocarbons contained in exhaust gases of an internal combustion engine.

Certain refractory materials, for example, the various high surface area refractory inorganic oxides such as alumina, silica, zirconia, alumina-silica, alumina-zirconia, etc., are efficient supports for any number of catalytically active materials when utilized in a particulate form. Such refractory supports are readily manufactured and commonly employed in the form of powders, pills, pellets, extrudates, or other particulate form including micro and macro spheroids resulting from spray-drying or dropping techniques. However, the described refractory materials, which embody the high surface area characteristics so essential to efficient catalyst support material, exhibit a physical instability under conditions of thermal stress which makes them generally unsuitable for use as a larger unitary support structure for catalytic components in the conversion, for example, of automobile exhaust gases.

On the other hand, the desired physical stability is realized by utilizing certain ceramic materials such as sillimanite, petalite, cordierite, mullite, zircon, zircon mullite, spodumene, magnesium silicates, aluminum silicates, etc., as a unitary catalyst support. However, although such ceramic materials are characterized by a low coefficient of thermal expansion — a particularly desirable feature in the larger unitary catalyst structures herein contemplated, they are invariably also characterized by a relatively low surface area which makes them generally unsuitable as an efficient catalyst support material. It has therefore been the practice to deposit a high surface area film or coating on the surface of the ceramic material, e.g., a thin, high surface area refractory inorganic oxide film or coating.

It is an object of this invention to present a novel method of applying a high surface area alumina as a uniform thin film on a rigid, low surface area, unitary support. The method of this invention is particularly directed to the manufacture of catalysts characterized by a rigid, unitary or homogenous skeletal structure, frequently referred to as a monolithic structure, comprising thin laminated sheets of a corrugated ceramic material providing a plurality of adjacent, parallel and uni-directional channels therethrough, and commonly referred to as a honeycomb. While the method of this invention can also be used to apply high surface area coatings on particulate, finely divided catalyst supports, the real advantage is in the application of high surface area coatings to the larger, unitary support structures in the manufacture of catalytic elements for inclusion in an exhaust gas converter system.

In one of its broad aspects, the present invention embodies a method of depositing a high surface area alumina as a uniformly thin film on a relatively low surface area refractory support, and comprises impregnating said low surface area refractory support with an alumina sol containing at least about 5 wt. percent of a soluble organic plasticizer; and calcining the impregnated refractory support at a temperature of at least about 425°C.

One of the more specific embodiments is in a method of depositing a high surface area alumina as a uniformly thin film on a cordierite honeycomb support which comprises impregnating said support with an aluminum chloride sol prepared by effecting a reduction in the chloride anion concentration of an aqueous aluminum chloride solution to provide an aluminum/chloride ratio of from about 1:1 to about 2:1, said sol containing from about 10 to about 20 wt. percent polyethylene glycol characterized by an average molecular weight of from about 200 to about 3,000; and calcining the impregnated honeycomb support at a temperature of from about 425° to about 1100°C.

Other objects and embodiments of this invention will become apparent in the following more detailed specification.

The alumina sols herein contemplated are such as are formed by reducing the acid anion concentration of an aqueous solution of an acid salt of aluminum whereby olation occurs with the formation of inorganic polymers of colloidal dimension suspended in the remaining liquid. Such sols are in contrast to a colloidal suspension of discrete, minute particles of a preformed alumina. Suitable acid salts of aluminum include aluminum chloride, aluminum sulfate, aluminum nitrate, aluminum acetate, and the like.

Reduction in the acid anion concentration of said solution can be accomplished in any conventional or otherwise convenient manner. For example, an aqueous aluminum chloride solution can be subjected to electrolysis utilizing an electrolytic cell with a porous partition between the anode and cathode whereby acid anions are removed from the cathode compartment with the formation of an alumina sol therein. In some cases, as with an aqueous aluminum acetate solution, where the anion is sufficiently volatile, the desired reduction in anion concentration can be effected simply by heating. A particularly suitable method of preparing a sol involves the use of aluminum metal as a neutralizing agent in conjunction with, for example, an aqueous aluminum chloride solution. In this instance, the salt of neutralization is itself a hydrolyzable aluminum salt subject to ultimate sol formation.

One convenient and preferred method, particularly suitable for the preparation of an aluminum sol comprises digesting aluminum pellets or slugs in aqueous hydrochloric acid, and reducing the chloride anion concentration of the resulting aluminum chloride solution through use of an excess of aluminum reactant as a neutralizing agent. The described sols are preferably prepared to contain about 15 wt. percent aluminum, preferably from about 12 to about 15 wt. percent, with an aluminum/chloride atom ratio of from about 1:1 to about 2:1. Generally, the sols will contain from about 8 to about 12 wt. percent chloride.

Pursuant to the present invention, the aforesaid sol further contains an organic plasticizer dissolved therein. The organic plasticizer is selected to improve the flexibility characteristics of the sol whereby blistering and cracking of the surface coating is minimized during the initial drying and calcining stages of the impregnated support material, and a durable, thin, uniform film of alumina is formed thereon. The organic plasticizer is suitably a polyethylene glycol with an average molecular weight of from about 200 to about 3,000, and preferably with an average molecular weight of from about 200 to about 700. plasticizers substantially as described are manufactured and available under the tradename "Carbowax". In any case, the plasticizer is utilized in an amount equivalent to at least about 5 wt. percent of the sol, and preferably from about 10 to about 20 wt. percent.

The alumina sol may also be prepared to contain a non-ionic surfactant, suitably at least about 0.05 wt. percent. Suitable nonionic surfactants include "the various" and well known polyoxyethylene alkylphenols, polyoxyethylene alcohols, polyoxyethylene esters of fatty acids, polyoxyethylene mercaptans, polyoxyethylene alkylamines, polyoxyethylene alkylamides, and the like. A polyoxyethylene alcohol with an average molecular weight of from about 200 to about 500 is particularly suitable. The surfactant may be included in the sol to facilitate penetration and even distribution of the sol, for example, in the fissures or clefts common to a honeycomb support structure. Preferably, the nonionic surfactant is utilized in an amount comprising from about 0.05 to about 0.5 wt. percent based on the weight of the alumina sol.

The low surface area ceramic support may be impregnated with the described sol by impregnating techniques known to the art. Thus, the ceramic support may be soaked, dipped, suspended, or otherwise immersed in the sol, suitably at ambient temperature conditions. The impregnation process may be repeated one or more times to deposit a satisfactory thin uniform coating on the surface of the ceramic support structure. In any case, the impregnated support is subsequently calcined in an oxidizing atomsphere at a termperature of at least about 425°C. to form the desired thin uniform high surface area alumina film deposited on the ceramic support.

The impregnated ceramic support is subsequently calcined over a period of from about 1 to about 5 hours at a temperature of from about 425° to about 1,100°C. In some instances it may be desirable to reduce or substantially eliminate the halogen associated with the alumina, and this is readily accomplished by effecting calcination in a steam-air atmosphere, for example in an air atmosphere containing from about 20 wt. percent to about 50 wt. percent steam.

The high surface area, alumina-coated, ceramic honeycomb structures of this invention are particularly adapted to the manufacture of a unitary catalyst element for the conversion of exhaust gases emanating from an internal combustion engine. Thus, the alumina-coated honeycomb support can be further composited with one or more catalytically active metallic components in the reduced or oxidized state. In the treatment of said exhaust gases, platinum has been shown to be a particularly effective catalyst. Other metallic components particularly active in this respect include copper oxide, and especially copper oxide in combination with one or more promoter oxides including the oxides of iron, nickel, cobalt, chromium, manganese, tin, vanadium, and the like. Still other catalytically active materials including the reduced or oxidized form of palladium, tungsten, molybdenum, silver, gold, rhenium, germanium, etc., known for their activity with respect to various catalytic processes, are readily composited with the support material of this invention.

The catalytic components are applied to the alumina-coated substrate by conventional methods which generally entail immersing the support in an aqueous solution of a precursor compound of a desired metallic component, and adsorbing and impregnating the same on the high surface area alumina coating. For example, the support is impregnated with an aqueous solution of chloroplatinic acid, platinum chloride, ammonium chloroplatinate, dinitrodiamino platinum, etc., and the impregnated support subsequently oxidized and/or reduced to yield the platinum component in an oxidized or reduced state. Precursor compounds of the catalytic metals which decompose upon calcination to provide the oxides can be used. These include the soluble hydroxides, carbonates, nitrates and/or organic salts of the various catalytically active metals, as well as ammonium salts such as ammonium metavanadate, and the like.

The following example is presented in illustration of the method of this invention and is not intended as an undue limitation on the generally broad scope of the invention as set out in the appended claims.

EXAMPLE I

An alumina sol was prepared by digesting an excess of aluminum in aqueous hydrochloric acid under reflux conditions (98°–115°C.). The sol contained 14.2 wt. percent aluminum in a 1.5:1 ratio with the chloride anion content thereof, and had a specific gravity of 1.4. About 1,860 milliliters of the sol thus prepared was admixed with 465 milliliters of a polyethylene glycol plasticizer having an average molecular weight of about 600 (Carbowax), and with 1.52 grams of a polyoxyethylene alcohol nonionic surfactant having an average molecular weight of about 240 (Antarox BL–240).

A cordierite ceramic honeycomb structure weighing 447.3 grams was then immersed in the described alumina sol with a gentle reciprocating movement in the direction of the parallel channels to insure contact and an even distribution of the sol on the honeycomb surface. After about 4 minutes, the impregnated honeycomb was removed and blown free of excess sol with a stream of air. The impregnated honeycomb, containing about 229.2 grams of alumina sol adhered to the surface thereof, was dried for about 2 hours in a forced-draft furnace at 150°C. The dried, impregnated honeycomb was subsequently heated to 540°C. over a ½ hour interval and then calcined at 540°C. for 2 hours in a stream of air containing about 30 wt. percent steam. While the ceramic honeycomb initially exhibited a surface area of less than about 1 m²/gm, the alumina-coated product had a surface area of about 21 m²/gm.

I claim as my invention:

1. A method of depositing a high surface area alumina as a uniformly thin film on a relatively low surface area refractory support which comprises:
    a. impregnating said support with an alumina sol containing at least about 5 wt. percent of a soluble polyethylene glycol (organic) plasticizer having an average molecule weight of from about 200 to about 3000; and
    b. calcining the impregnated support at a temperature of at least about 425°C.

2. The method of claim 1 further characterized in that said refractory support is a ceramic honeycomb structure of cordierite.

3. The method of claim 1 further characterized in that said alumina sol is prepared by effecting a reduction in the acid anion concentration of an aqueous solution of a hydrolyzable acid salt of aluminum.

4. The method of claim 1 further characterized in that said alumina sol is an aluminum chloride sol prepared by effecting a reduction in the chloride anion concentration of an aqueous solution of aluminum chloride.

5. The method of claim 1 further characterized in that said alumina sol is an aluminum chloride sol prepared by effecting a reduction in the chloride anion concentration of an aqueous solution of aluminum chloride to provide an aluminum/chloride ratio of from about 1:1 to about 2:1.

6. The method of claim 1 further characterized in that said sol contains from about 10 to about 20 wt. percent of said plasticizer.

7. The method of claim 1 further characterized in that said sol further contains from about 0.05 to about 0.5 wt. percent of a polyoxyethylene alcohol surfactant characterized by an average molecular weight of from about 200 to about 500.

8. The method of claim 1 further characterized in that said impregnated support is calcined at a temperature of from about 425° to about 1,100°C.

* * * * *